(12) United States Patent
Braverman et al.

(10) Patent No.: US 9,158,822 B2
(45) Date of Patent: Oct. 13, 2015

(54) SYSTEM AND METHOD FOR PICK-AND-DROP SAMPLING

(71) Applicants: Vladimir Braverman, Baltimore, MD (US); Rafail Ostrovsky, Los Angeles, CA (US)

(72) Inventors: Vladimir Braverman, Baltimore, MD (US); Rafail Ostrovsky, Los Angeles, CA (US)

(73) Assignees: THE JOHNS HOPKINS UNIVERSITY, Baltimore, MD (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 512 days.

(21) Appl. No.: 13/684,402

(22) Filed: Nov. 23, 2012

(65) Prior Publication Data
US 2014/0149364 A1    May 29, 2014

(51) Int. Cl.
*G06F 17/30* (2006.01)
(52) U.S. Cl.
CPC .... *G06F 17/30536* (2013.01); *G06F 17/30516* (2013.01)
(58) Field of Classification Search
USPC .......................................................... 707/692
See application file for complete search history.

(56) References Cited

U.S. PATENT DOCUMENTS 6,167,392 A * 12/2000 Ostrovsky et al. ..................... 1/1
6,640,244 B1 * 10/2003 Bowman-Amuah .......... 709/207
2002/0196882 A1 * 12/2002 Wang et al. .................... 375/355
2006/0149998 A1 *  7/2006 Prigent ............................. 714/6
2012/0039396 A1 *  2/2012 Ihara ........................ 375/240.25
2014/0108359 A1 *  4/2014 Banaei-Kashani et al. ... 707/692

OTHER PUBLICATIONS

Alon, et al., The Space Complexity of Approximating the Frequency Moments, Journal of Computer and System Sciences, 1999, 58:137-147.

(Continued)

*Primary Examiner* — Sangwoo Ahn
*Assistant Examiner* — Ahmed Abraham
(74) *Attorney, Agent, or Firm* — Quarles & Brady, LLP

(57) ABSTRACT

A database system includes an input to a database server configured to deliver a data stream formed of a sequence of elements, $D=\{p_1, p_2, \ldots, p_m\}$ of size m of numbers from $\{1, \ldots, n\}$ to the database server. The system further includes a computer program that causes a processor to approximate frequency moments ($F_k$) in the data stream, such that a frequency of an element (i) is defined as $f_i = |\{j : p_j = i\}|$ and a k-th frequency moment of D is defined as $$F_k = \sum_{i=1}^{n} m_i^k \text{ in a}$$

single pass through the data stream. The processor is caused to carry out the steps of locating elements (i) with a frequency $\Omega F_k$ in the data stream as heavy elements and approximating $f_i$ as ≥ a fraction of $f_i$ to limit memory resources used by the processor to estimate $F_k$ to $O(n^{1-2/k} \log(n))$ bits.

13 Claims, 2 Drawing Sheets

(56) References Cited

OTHER PUBLICATIONS

Braverman, et al., Recursive Sketching for Frequency Moments, arXiv:1011.2571v1 [cs.DS], 2010, 13 pages.

Charikar, et al., Finding Frequent Items in Data Streams, in ICALP '02: Proceedings of the 29th International Colloquium on Automata, Languages and Programming, London, UK, 2002, Springer-Verlag, 11 pages.

* cited by examiner

SYSTEM AND METHOD FOR PICK-AND-DROP SAMPLING

BACKGROUND OF THE INVENTION

The present invention relates generally to systems and methods for signal processing. More specifically, the present invention relates to a system and method for estimating frequency moments in data stream processing algorithms.

In many signal processing application, the signal must be processed in a few or, often, just one pass. For example, a "data stream" is often referred to as a sequence of data that is too large to be stored, in its entirety, in memory. Such data streams are common in communications network traffic, database transactions, satellite data feeds, and the like. In such instances, "streaming algorithms" are used to process these signals as data streams forming an input presented as a sequence of items that can be examined in very few passes. A common example of a streaming algorithm is one developed to count the number of distinct elements in a data stream. The continuous nature of the underlying signal and the resource constraints that limit the amount of repetitive processing performed general result in the algorithm producing an approximate answer based on a summary of the data stream that is stored.

Alon, Matias, and Szegedy, in *The Space Complexity of Approximating the Frequency Moments*, Journal of Computer and System Sciences, 58:137-147, 1999, which is incorporated herein by reference in its entirety, approached such a signal processing problem, within the context of database processing, and introduced the concept of "frequency moments." Namely, for a sequence of elements, $D=\{p_1, p_2, \ldots, p_m\}$ of size m of numbers from $\{1, \ldots, n\}$, a frequency of an element, I, is defined as:

$$f_i = |\{j : p_j = i\}| \qquad \text{Eqn. 1.}$$

The k-th frequency moment of D is defined as:

$$F_k = \sum_{i=1}^{n} m_i^k. \qquad \text{Eqn. 2}$$

Alon, Matias, and Szegedy, when approaching the problem of approximating frequency moments in one pass over D and using sublinear space, observed a striking difference between "small" and "large" values of k. Specifically, it is possible to approximate $F_k$ for $k \leq 2$ in polylogarithmic space. However, polynomial space is required when $k > 2$. Since the work of Alon, Matias, and Szegedy in the late 1990's, approximating $F_k$ has become one of the most inspiring problems in the theory of data streams.

For example, many have focused on efficient algorithms for estimating particular moments, such as $F_2$, which is useful for computing statistical properties of the data. Others have focused on bounding the memory required of $F_k$ approximation algorithms. For example, many proposed solutions or bounds having accuracy up to a polylogarithmic factor. However, as noted above, since a polynomial space is required when $k > 2$, suitably efficient approximations for frequency moments for $k \geq 3$ have been lacking.

It would therefore be desirable to provide a system and method for approximating frequency moments with a reduced space complexity than traditional dictated for $k \geq 3$.

SUMMARY OF THE INVENTION

The present invention overcomes the aforementioned drawbacks by providing a method of non-uniform sampling to find frequency moments in a data stream.

In accordance with one aspect of the invention, a database system includes a database and a database server configured to control reading data from and writing data to the database. The system also includes an input to the database server configured to deliver a data stream formed of a sequence of elements, $D=\{p_1, p_2, \ldots, p_m\}$ of size m of numbers from $\{1, \ldots, n\}$ to the database server. The system further includes a non-transitive, computer-readable storage medium, having stored thereon, a computer program that, when executed by a processor, causes the processor to approximate frequency moments $(F_k)$ in the data stream, such that a frequency of an element (i) is defined as $f_i = |\{j : p_j = i\}|$ and a k-th frequency moment of D is defined as $$F_k = \sum_{i=1}^{n} m_i^k$$

in a single pass through the data stream. The processor is caused to carry out the steps of (a) arranging a portion of the data stream in a matrix, (b) selecting an initial element in the matrix, and (c) checking the matrix for a duplicate of the initial element. Upon identifying a duplicate of the initial element in the matrix, the processor is caused carry out the step of (d) assuming that the initial element appears in each row of the matrix, assigning binary values to all other frequencies, and disregarding the initial element. Upon completing step (c) without identifying a duplicate of the initial element, the processor is caused to carry out the step of (e) assigning a binary value to all frequencies. Steps (b) through (e) are repeated as step (f) for a each subsequent element in the matrix and step (g) is performed by generating a report of approximated frequency moments in the data stream In accordance with another aspect of the invention, a method for approximating frequency moments $(F_k)$ in data streams formed of a sequence of elements, $D=\{p_1, p_2, \ldots, p_m\}$ of size m of numbers from $\{1, \ldots, n\}$ is disclosed, such that a frequency of an element (i) is defined as $f_i = |\{j : p_j = i\}|$ and a k-th frequency moment of D is defined as $$F_k = \sum_{i=1}^{n} m_i^k.$$

The method includes the steps of (a) arranging a portion of the data stream in a matrix, (b) selecting an initial element in the matrix, and (c) checking the matrix for a duplicate of the initial element. The method also includes (d) upon identifying a duplicate of the initial element in the matrix, assuming that the initial element appears in each row of the matrix, assigning binary values to all other frequencies, and disregarding the initial element. The method further includes, (e) upon completing step (c) without identifying a duplicate of the initial element, assigning a binary value to all frequencies. The method additionally includes (f) repeating steps (b) through (e) for each subsequent element in the matrix and (g) generating a report of approximated heavy elements.

In accordance with another aspect of the present invention, a a database system is disclosed that includes a database and a database server configured to control reading data from and writing data to the database. The system also includes an input to the database server configured to deliver a data stream formed of a sequence of elements, $D=\{p_1, p_2, \ldots, p_m\}$ of size m of numbers from $\{1, \ldots, n\}$ to the database server. The system further includes a non-transitive, computer-readable storage medium, having stored thereon, a computer program that, when executed by a processor, causes the processor to approximate frequency moments ($F_k$) in the data stream, such that a frequency of an element (i) is defined as $f_i=|\{j:p_j=i\}|$ and a k-th frequency moment of D is defined as $$F_k = \sum_{i=1}^{n} m_i^k$$

in a single pass through the data stream. The processor is caused to carry out the steps of locating elements (i) with a frequency $\Omega F_k$ in the data stream as heavy elements and approximating $f_i$ as $\geq$ a fraction of $f_i$ to limit memory resources used by the processor to estimate $F_k$ to $O(n^{1-2/k} \log(n))$ bits.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

1. Introduction.

Figure 1:
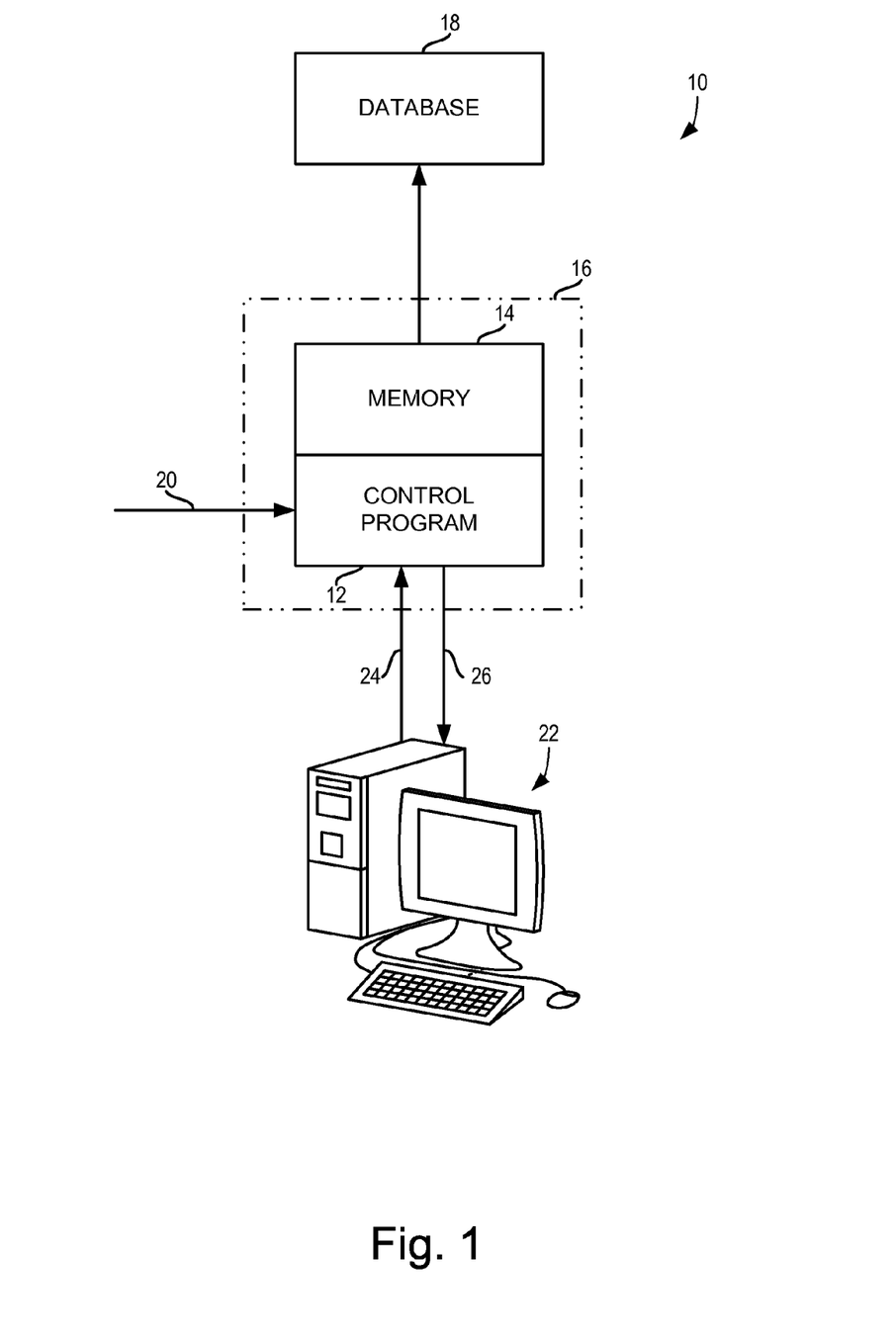
FIG. 1 is a block diagram of a system for use with the present invention.

Referring to FIG. 1, a system for implementing an algorithm in accordance with the present invention is illustrated. As shown in FIG. 1, the system 10 includes a control program 12 and a memory 14 which, for example, may be resident in a database server 16 supporting database 18. Every data item to be input to the database 18 input through a data input channel 20 where the data item is processed by the control program 12.

As will be described, when a command is received from a computer system 22 accessing the system 10 the over a control channel 24 to provide an estimate of a frequency moment, the control program 12 is invoked to generate an estimated frequency moment for output on output channel 26. To this point, the present invention provides a system and method for approximating frequency moments in insertion-only data streams for k≥3. For any constant, c, the present invention can show an $O(n^{1-2/k} \log(n)\log^{(c)}(n))$ upper bound on the space complexity of the problem. Here log(c)(n) is the iterative log function. To simplify the presentation, the following assumptions can be made:

n and m are polynomially far; and
approximation error $\epsilon$ and parameter k are constants.

A natural bijection between streams and special matrices can be observed. As described hereafter, the present invention provides a non-uniform sampling method referred to herein as "a pick-and-drop sampling."

Figure 2:
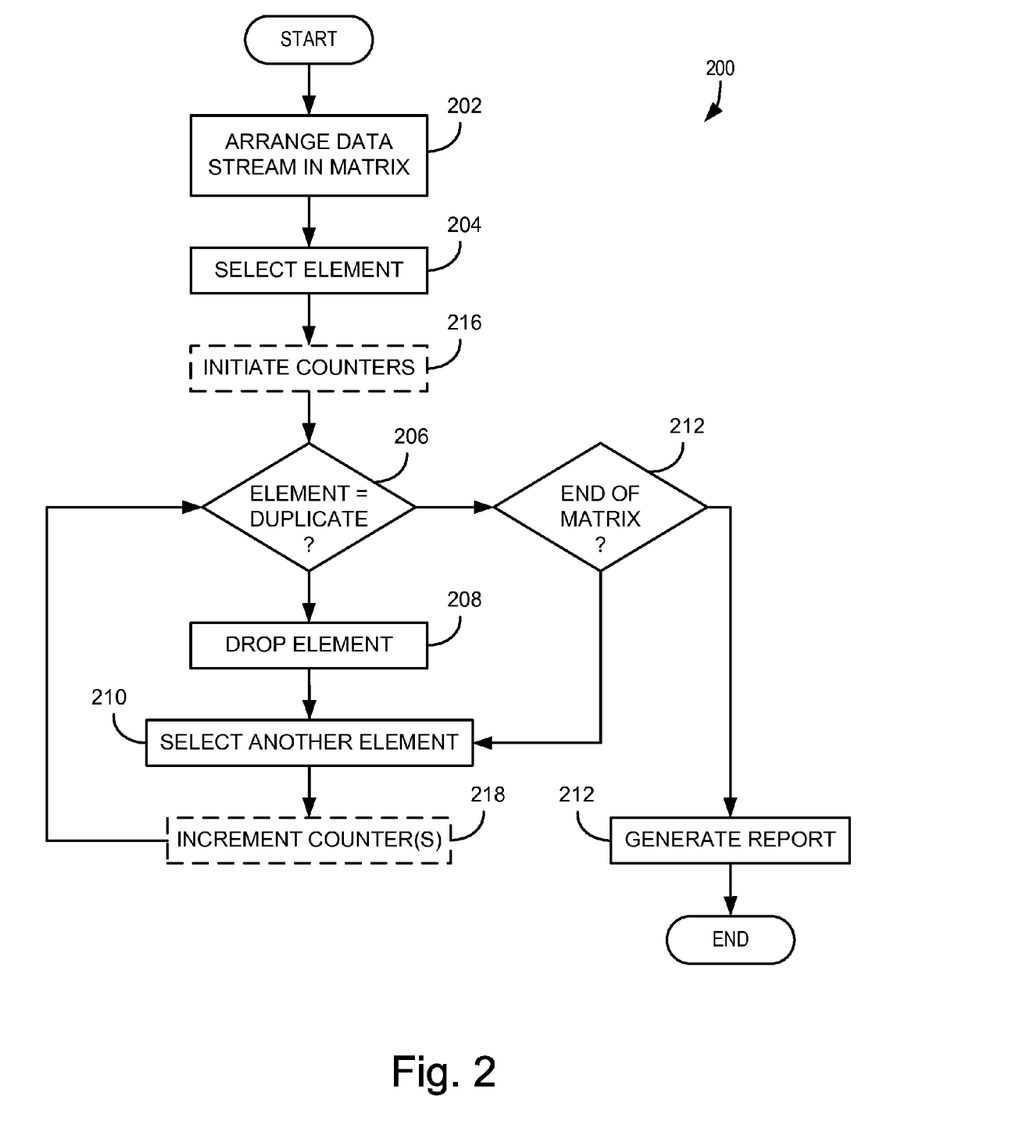
FIG. 2 is a flow chart setting forth the steps of an exemplary method in accordance with the present invention and for use with systems, such as illustrated in FIG. 1.

To illustrate a pick-and-drop method in accordance with the present invention, an example can be utilized where m=r*t and r=[$n^{1/5}$]. In this context and referring to FIG. 2, the following example of a sampling method 200 in accordance with the present invention is described. At process block 202, the data stream is arranged into a matrix. Arranging the data stream in the matrix may be achieved via a logical arrangement. By way of the present non-limiting example, consider r×t matrix, M, with entries $m_{ij}=p_{k(i-1)+j}$. For m≤n, the following promise problem can be solved with probability ⅔:

case 1—all frequencies are either zero or one;
case 2—z appears in every row of M exactly once and, thus, $f_z=r$; and
all other frequencies are either zero or one.

At process block 204, an element is selected for analysis. The element may be selected at random. Specifically, r independent and identically distributed (i.i.d.) random numbers $I_1, \ldots, I_r$, can be picked, where $I_i$ is uniformly distributed on $\{1,2,\ldots,t\}$. At decision block 206, for a given element (and, as will be described, each i=1 ... r−1), a check for a duplicate of $m_{i,I_i}$ in the row i+1 is made. If the duplicate is found, in this example, then we output "case 2" by assuming that z appears in every row of M exactly once. More generally, at process block 208, the i-th sample is "dropped," and, at process block 210, another element is selected, for example, to "pick" the (i+1)-th sample. This process is repeated T times independently.

Returning to decision block 206, if no duplicate is found, at decision block 212, a check is made to determine whether the end of the matrix has been reached. If not, another element is selected at process block 210. Once the end of the matrix is reached, at process block 212, a report is generated, for example, to report the "heavy elements." Heavy elements are the element that appear often in the data stream. Frequency moments area a function of the data stream. As will be described, the present invention provides a system and method for determining a frequency moment using heavy elements, but the heavy element can be used for other and additional purposes.

By way of the present example, "case 1" is output in the report if no duplicate is found. Note, if the input represents case 1, the method will always output "case 1." Consider case 2 and observe that, if $m_{i,I_i}=z$, then case 2 will be output. Indeed, since z appears in every row, the duplicate of z will be found. The probability to miss z entirely is:

$$\left(1-\frac{1}{t}\right)^{rT}. \qquad \text{Eqn. 3}$$

Recall that m≤n,m=rt,r=[$n^{1/k}$]. If T=$O(n^{1-2/k})$ with sufficiently large constant, then the probability of error with respect to eqn. 3 is smaller than ⅓. Accordingly, the promise problem can be resolved with $O(n^{1-2/k} \log(n))$ space. Notably, the solution depends upon r. Thus, in general, it is prudent to carefully select the matrix.

Unfortunately, the distribution of the frequent element in the stream can be arbitrary. Also the algorithm should desirably recognize "noisy" frequencies that are large but negligible. Clearly, the sampling would be desirable if more intricate but, luckily, it need not be rendered greatly more complex.

Accordingly, still referring to FIG. 2, counters can be used. Specifically, a local counter can be introduced for each sample that counts the number of times $m_{i,I_i}$ appears in the suffix of the i-th row. Notably, such a counting method was used by Alon, Matias, and Szegedy, in *The Space Complexity of Approximating the Frequency Moments*, for the entire stream. In contrast, in the present invention it is contemplated that a global sample (and a global counter), as functions of the local samples and counters, may be used. Initially, at process block 216 the global sample is the local sample of the first row and incremented at process block 218 only when the local counter indicates such.

Notably, under certain conditions, the global sample can be "dropped." If this is the case, then the local sample of the current row is "picked" and becomes the new global sample. The global sample is "dropped" when the local counter exceeds the global one. Also, the global sample is dropped if the global counter does not grow fast enough. A function, $\lambda q$, where $\lambda$ is a parameter and q is the number of rows that the global counter survived. If the global counter is smaller than $\lambda q$, then the global sample is "dropped."

2. Pick-and-Drop Sampling

Let M be a matrix with r rows and t columns and with entries $m_{i,j} \in [n]$. For $i \in [r]$, $j \in [t]$, $l \in [n]$ define:

$$d_{i,j} = |\{j' : j \leq j' \leq t, m_{i,j'} = m_{i,j}\}|; \quad \text{Eqn. 4}$$

$$f_{l,i} = |\{j \in [t] : m_{i,j} = l\}|; \quad \text{Eqn. 5}$$

$$f_l = |\{(i,j) : m_{i,j} = l\}|; \quad \text{Eqn. 6}$$

$$F_k = \sum_{l=1}^{n} f_l^k, \quad G_k = F_k - f_1^k. \quad \text{Eqn. 7}$$

Note that there is a bijection between rxt matrices M and streams D of size rxt with elements $p_{it+j} = m_{i,j}$, where the definitions with respect to eqns. 2, 1 and 6, 7, define equivalent frequency vectors for a matrix and the corresponding stream. Without loss of generality, consider streams of size rxt for some r,t. The notions of a stream and its corresponding matrix can be interchanged.

Let $\{I_j\}_{j=1}^{r}$ be i.i.d. random variables with uniform distributions on $[t]$. Define for $i=1,\ldots,r$:

$$s_i = m_{i,I_i}, \quad c_i = d_{i,I_i} \quad \text{Eqn. 8}$$

Let $\lambda$ be a parameter. Define the following recurrent random variables:

$$S_1 = s_1, \quad C_1 = c, \quad q_1 = 1 \quad \text{Eqn. 9}$$

Also (for $i = 2, \ldots r$), if:

$$(C_{i-1} < \max\{\lambda q_{i-1}, c_i\}) \quad \text{Eqn. 10}$$

then define:

$$S_i = s_i, \quad C_i = c_i, \quad q_i = 1 \quad \text{Eqn. 11}$$

otherwise, define:

$$S_i = S_{i-1}, \quad C_i = C_{i-1} + f_{S_i,i}, \quad q_i = q_{i-1} + 1 \quad \text{Eqn. 12}$$

Therefore, Theorem 2.1 states: If M is a rxt matrix, there exist absolute constants $\alpha, \beta$ such that, if:

$$\alpha\left(\lambda r + \frac{G_3}{\lambda t} + \frac{G_2}{t}\right) \leq f_1 \leq \beta t; \quad \text{Eqn. 13}$$

then:

$$P(S_r = 1) \geq \frac{f_1}{2t}. \quad \text{Eqn. 14}$$

Proof. Denote $Q = \{(i,j) : m_{i,j} = 1\}$. For $(i,j) \in Q$, define:

$$T_{i,j} = \overline{(A_{i,j} \cup B_{i,j} \cup H_{i,j})} \quad \text{Eqn. 15}$$

where for $i > 1$:

$$A_{i,j} = ((C_{i-1} \geq d_{i,j}) \cap (S_{i-1} \neq 1)) \quad \text{Eqn. 16}$$

for $i < r$:

$$B_{i,j}\left(\bigcup_{h=i+1}^{r}\left(d_{i,j} + \sum_{u=i+1}^{h-1} f_{1,u} < c_h\right)\right); \quad \text{Eqn. 17}$$

$$H_{i,j}\left(\bigcup_{h=i+1}^{r}\left(d_{i,j} + \sum_{u=i+1}^{h-1} f_{1,u} < (h-1)\lambda\right)\right); \quad \text{Eqn. 18}$$

and $A_{i,j} = B_{r,j} = H_{r,j} = 0$. We have:

$$((s_i = 1) \cap (S_{i-1} \neq 1) \cap \overline{A_{i,I_i}} \subseteq ((s_i = 1) \cap (C_{i-1} > c_i)) \subseteq \\ ((S_i = 1) \cap (q_i = 1)) \quad \text{Eqn. 19}$$

Consider the case when $S_i = 1$ and $q_i = 1$ and $$d_{i,I_i} + \sum_{u=i+1}^{h-1} f_{1,u} \geq \max(\lambda(h-i), c_h) \text{ for all } h > i.$$

In this case $S_h$ will be defined by eqn. 12 and not by eqn. 11. In particular, $S_h = S_i = 1$. Therefore:

$$((S_i = 1) \cap (q_i = 1) \cap \overline{B_{i,I_i}} \cap \overline{H_{i,I_i}} \subseteq \left(\bigcap_{h=i}^{r}(S_h = 1)\right). \quad \text{Eqn. 20}$$

Define $V_1 = ((s_1 = 1) \cap T_{1,I_1})$ and, for $i > 1$, $V_i = ((s_i = 1) \cap (S_{i-1} \neq 1) \cap T_{i,I_i})$. It follows from eqns. 19 and 20 that, for any $i \in [r]$:

$$V_i \subseteq (S_r = 1) \quad \text{Eqn. 21};$$

$$V_i \cap V_j = 0 \quad \text{Eqn. 22}.$$

Thus:

$$\sum_{i=1}^{r} P\left(V_i \bigcup_{i=1}^{r} V_i\right) \leq P(S_r = 1). \quad \text{Eqn. 23}$$

For any $i > 1$, $P(V_i) \geq P((s_i = 1) \cap T_{i,I_i}) - P(s_i = S_{i-1} = 1)$. Also, $$\left(\sum_{i=2}^{r} P(s_i = S_{i-1} = 1) \sum_{i=2}^{r} P\left((s_i = I) \cap \left(\bigcup_{h \neq i}(s_h = 1)\right)\right) \leq \left(\sum_{i=1}^{r} P(s_i = 1)\right)^2 = \left(\frac{f_1}{t}\right)^2.$$

For any fixed $(i,j) \in Q$ events $I_i = j$ and $T_{i,j}$ are independent. Indeed, $A_{i,j}$ is defined by $\{S_{i-1}, C_{i-1}\}$ that, in turn, id defined by $\{I_1, \ldots, I_{i-1}\}$. Similarly, $B_{i,j}$ is defined by $\{I_{i+1}, \ldots, I_r\}$. Note that $H_{i,j}$ is a deterministic event. By definition, $\{I_1, \ldots, I_{i-1}, I_{i+1}, \ldots, I_r\}$ are independent of $I_i$. Thus, event $I_i = j$ and $T_{i,j} = \overline{(A_{i,j} \cup B_{i,j} \cup H_{i,j})}$ are independent. Thus:

$$\sum_{i=2}^{r} P((S_i = 1) \cap T_{i,l_i}) = \sum_{(i,j) \in Q} P((I_i = j) \cap T_{i,j}) \quad \text{Eqn. 24}$$
$$= \sum_{(i,j) \in Q} P(I_i = j) P(T_{i,j})$$
$$= \frac{1}{t} \sum_{(i,j) \in Q} P(T_{i,j}).$$

Thus, $$P(S=1) \geq \frac{1}{t} \sum_{(i,j) \in Q} P(T_{i,j}) - \left(\frac{f_1}{t}\right)^2.$$

As will be clear, Lemma 2.2 implies that $\Sigma_{(i,j) \in Q} P(T_{i,j}) \geq 0.8 f_1$. Thus, if $\beta < 0.3$, then $$P(S_r = 1) \frac{f_1}{t} \left(0.8 - \frac{f_1}{t}\right) \geq \frac{f_1}{2t}.$$

Here, only the second part of eqn. 13 was used. The first part is used in the proof of Lemma 2.2.

Lemma 2.2. There exists absolute constants $\alpha, \beta$ such that eqn. 13 implies $$\sum_{(i,j) \in Q} P(T_{i,j}) > 0.8 \, f_1.$$

It follows from Lemmas 2.9, 2.17, and 2.14 and the union bound that there exists at lest $0.97 f_1$ pairs $(i,j) \in Q$, such that $P(A_{i,j} \cup B_{i,j} \cup H_{i,j}) \leq 0.02$. Recall that $T_{i,j} = \overline{(A_{i,j} \cup B_{i,j} \cup H_{i,j})}$. The lemma follows.

Events of type A.

For $(i,j) \in Q_{such\ that}$ $i>1$ and for $l>1$, define:

$$Y_{l,(i,j)} = 1_{A_{i,j}} 1_{(S_{i-1}=l)},$$
$$Y_{l,i} = \sum_{j \in [t], (i,j) \in Q} Y_{l,(i,j)},$$
$$Y_l = \sum_{i=2}^{r} Y_{l,i},$$
$$Y = \sum_{l=2}^{n} Y_l,$$

Fact 2.3. $C_i \leq f s_i, i$. Also, if $q_i = 1$, then $C_i \leq f s_i, i$.

Proof. It follows directly from eqns. 11 and 12 that it is sufficient to prove, for any i, there exists a set $Q_i$, such that $C_i \leq |Q_i|$ and, simultaneously, $Q_i$ is a subset of $\{(i',j) : m_{i',j} = S_i, i' \leq i\}$. Through the induction on i, the above claim can be proven. For $i=1$, the claim is true since we can define $Q_1 = \{(1,j) : j \geq I_1\}$. For $i>2$, the description of the algorithm implies the following. If $q_i = 1$, then we can put $Q_i = \{(i,j) : j \geq I_i\}$. If $q_i > 1$, then define $Q_i = Q_{i-1} \cap \{(i,j) : m_{i,j} = S_i\}$. Note that in this case, $S_i = S_{i-1}$. The second part follows form the description of the algorithms. Namely, if $p_i = 1$, then $C_i = c_i$, $S_i = s_i$, and $c_i = d_{i,I_i}(s) \leq f_{s_i, i}$.

Fact 2.4.

1. $Y_{l,i} \leq f_l$,
2. If $q_{i-1} = 1$, then $Y_{l,i} \leq f_{l,i-1}$

Proof. Let $(i,j) \in Q$ be such that $d_{i,j} > f_l$; then $Y_{l,(i,j)} = 1_{(c_{i-1} \geq d_{i,j})} 1_{(s_{i-1}=1)} = 1_{(f_l \geq c_{i-1})} 1_{(c_{i-1} \geq d_{i,j})} 1_{(s_{i-1}=1)}$. Use Fact 2.3 for this last equality. Thus, $Y_{l,(i,j)} = 0$. The definition of $d_{i,j}$ implies $|\{j : (i,j) \in Q, d_{i,j} \leq f_l\}| \leq f_l$ for any fixed i and l. Thus, $$Y_{l,i} = \sum_{j \in [t], (i,j) \in Q} Y_{l,(i,j)} \leq f_l.$$

Part 2 follows by repeating the above arguments and using the second statement of Fact 2.3.

Definition 2.5. Let $1 \leq r_1 \leq r_2 \leq r$ and $l \in [n]$. Call a pair $[r_1, r_2]$ an I-epoch if $\forall i = r_1, \ldots, r_2 : S_i = 1$ and $q_{r_1} = q_{r_2+1} = 1$, and $\forall i = r+1_1, \ldots, r_2 : q_i = q_{i-1} + 1$.

Lemma 2.6. Let $[r_1, r_2]$ be an I-epoch. If $r_2 > r_1$, then, $$r_2 - r_1 \leq \frac{1}{\lambda} \sum_{i=r_1}^{r_2-1} f_{l,i}.$$

Proof. First, observe that $q_{r_2-1} = r_2 - r_1$. Second, $q_i > 1$ implies that $S_i$ is defined by eqn. 12 and not by eqn. 11 for all $r_1 < i \leq r_2$. In particular, $C_{r_1} \leq f_{l,r_1}$ and for $r_1 < i \leq r_2$ we have $C_i = C_{i-1} + f_{l,i}$. Thus, $$C_{r_2-1} \leq \sum_{i=r_1}^{r_2-1} f_{l,i}.$$

Third, $C_{r_2-1} \geq \lambda q_{r_2-1}$, since eqn. 10 must be false for $i = r_2$. Therefore, $$r_2 - r_1 = q_{r_2} - 1 \leq \frac{1}{\lambda} C_{r_2-1} \leq \frac{1}{\lambda} \sum_{i=r_1}^{r_2-1} f_{l,i}.$$

Lemma 2.7.

$$Y_l \leq \frac{f_l^2}{\lambda} + f_l.$$

Proof. Observe that the set $\{i : S_i = 1\}$ is a collection of disjoint I-epochs. Recall that and $Y_l \Sigma_{i=2}^r Y_{l,i}$ and $Y_{l,i}$ is non-zero only if $S_{i-1}$ is equal to 1. Thus, $Y_l$ can be rewritten as $$Y_l = \sum_{(r_1, r_2) is\_an\_l-epoch} \left( \sum_{i=r_1+1}^{r_2+1} Y_{l,i} \right).$$

For any epoch such that $r_2 > r_1$, we have by Lemmas 2.4 and 2.6:

$$Y_l = \sum_{(r_1 < r_2) \text{is\_an\_}l\text{-epoch}} \left( \sum_{i=r_1+1}^{r_2+1} Y_{l,i} \right) + \sum_{(r_1 = r_2) \text{is\_an\_}l\text{-epoch}} Y_{l,r_2+1} =$$

$$\sum_{(r_1 < r_2) \text{is\_an\_}l\text{-epoch}} \left( \sum_{i=r_1+1}^{r_2} Y_{l,i} \right) + \sum_{(r_1, r_2) \text{is\_an\_}l\text{-epoch}} Y_{l,r_2+1} \leq$$

$$\frac{f_l}{\lambda} \sum_{(r_1 < r_2) \text{is\_an\_}l\text{-epoch}} \left( \sum_{i=r_1}^{r_2-1} f_{l,i} \right) + \sum_{(r_1, r_2) \text{is\_an\_}l\text{-epoch}} f_{l,r_2+1} \leq \frac{f_l^2}{\lambda} + f_l.$$

Lemma 2.8.

$$P(Y_l > 0) \leq \frac{f_l}{t}.$$

Proof. Since $I_i$ are independent and $$0 \leq \frac{f_{l,i}}{t} \leq 1$$

we can apply Fact 2.10 as $$P\left( \bigcap_{i=1}^{r} (m_{i,l_i} \neq l) \right) = \prod_{i=1}^{r} \left( 1 - \frac{f_{l,i}}{t} \right) \geq \left( 1 - \frac{f_l}{t} \right).$$

Thus:

$$P(Y_l > 0) P\left( \bigcup_{i=1}^{r} (m_{i,l_i} = l) \right) \leq \frac{f_l}{t}. \quad \text{Eqn. 25}$$

Lemma 2.9. There exists an absolute constant $\alpha$ such that eqn. 13 implies that $P(A_{i,j}) \leq 0.01$ for at least $0.99\, f_1$ pairs $(i,j) \in Q$.

Proof. From Lemmas 2.7 and 2.8, $$E(Y_l) \leq \frac{f_l}{t} \left( \frac{f_l^2}{\lambda} + f_l \right),$$

$$E(l) = \sum_{l=2}^{n} E(Y_l) \leq \frac{G_3}{\lambda t} + \frac{G_2}{t}.$$

It follows that $\Sigma_{(i,j) \in Q} 1_{A_{i,j}} - Y$. Recall that by eqn. 13, $$|Q| = f_1 \geq \alpha \left( \frac{G_3}{\lambda t} + \frac{G_2}{t} \right) \geq \alpha E \left( \sum_{(i,j) \in Q} 1_{A_{i,j}} \right).$$

Fact 2.11 implies that there exists an absolute constant $\alpha$ such that the lemma is true.

The following fact is well known. For completeness, the proof is presented below.

Fact 2.10. Let $\alpha_1, \ldots, \alpha_r$ be real numbers in $[0,1]$. Then, $$\prod_{i=1}^{r} (1 - \alpha_i) \geq 1 - \left( \sum_{i=1}^{r} \alpha_i \right).$$

Proof. If $\Sigma_{i=1}^{r} \alpha_i \geq 1$, then $$\prod_{i=1}^{r} (1 - \alpha_i) \geq 0 \geq 1 - \left( \sum_{i=1}^{r} \alpha_i \right).$$

Thus, we can assume that $\Sigma_{i=1}^{r} \alpha_i < 1$. This claim can be proven by induction on r. For $r=2$, we obtain $(1-\alpha_1)(1-\alpha_2) = (1-\alpha_1-\alpha_2+\alpha_1\alpha_2) \geq (1-\alpha_1-\alpha_2)$. For $r>2$, we have, by induction, $$\prod_{i=1}^{r} (1 - \alpha_i) \geq \left( 1 - \left( \sum_{i=1}^{r-1} \alpha_i \right) \right)(1 - \alpha_r) \geq 1 - \left( \sum_{i=1}^{r} \alpha_i \right).$$

Fact 2.11. Let $X_1, \ldots, X_u$ be a sequence of indicator random variables. Let $S = \{i : P(X_i = 1) \leq v\}$. If $E(\Sigma_{i=1}^{u} X_i) \leq \mu u$ then $$|S| \geq \left( 1 - \frac{\mu}{v} \right) u.$$

Proof. Indeed, $$\mu u \geq \sum_{i \notin S} P(X_i = 1) \geq v(u - |S|).$$

Events of type B.

For $(i,j) \in Q$ let $Z_{(i,j)} = 1_{B_{i,j}}$. Let $Z = \Sigma_{(i,j) \in Q} Z_{(i,j)}$. We use arguments that are similar to the ones from the previous section. To stress the similarity, we abuse the notation and denotation by $Y_{l,j(i,j)}$ the indicator of the event that $h \geq i+1, s_h = 1$ and $$\left( d_{i,j} + \sum_{u=i+1}^{h-1} f_{1,u} \right) < c_h.$$

Define $Y_{l,j} = \Sigma_{(i,j) \in Q} Y_{l,h,(i,j)}$, $Y_l = \Sigma_{h=1}^{r} Y_{l,h}$.

Fact 2.12. $Y_l \leq f_l$.

Proof. Repeating the arguments from Fact 2.4, we have $c_h 1_{s_h=1} \leq f_{l,h}$ and thus $Y_{l,h} \leq f_{l,h}$.

Fact 2.13.

$$P(Y_l > 0) \leq \frac{f_l}{t}.$$

Proof. The proof is identical to the proof of Lemma 2.8.

Lemma 2.14. There exists absolute constants $\alpha, \beta$ such that eqn. 13 implies that $P(B_{i,j}) \leq 0.01$ for at least $0.99\, f_1$ pairs $(i,j) \in Q$.

Proof. Denote $Y=\Sigma_{l=1}^{n} Y_l$. It follows that $Z \le Y$ and $E(Z) \le E(Y)$. By Facts 2.13 and 2.12, it follows that $$E(Y_l) \le \frac{f_l^2}{t}.$$

Thus, by eqn. 13, $$E(Z) \le E(Y) \le \frac{F_2}{t} = \frac{G_2}{t} + f_1\frac{f_1}{t} \le (\alpha + \beta)f_1.$$

We repeat the arguments from Lemma 2.9.
Events of type H
Definition 2.15.
Let $U=\{u_1, \ldots, u_t\}$ and $W=\{w_1, \ldots, w_t\}$ be two sequences of non-negative integers. Let $(i,j)$ be a pair such that $1 \le i \le t$ and $1 \le j \le u_i$. Denote $(i,j)$ as a loosing pair (with respect to sequences U,W) if there exists $h, i \le h \le t$ such that $$-j + \sum_{s=i}^{h}(u_s - w_s) < 0.$$

Denote any pair that is not a loosing pair as a winning pair.
Now, we consider the following pair (U,W) then $H_{i,j'}$ does not occur where j' is such that $m_{i,j'=1}$ and $d_{i,j'}=f_{1,i}-j+1$.
Proof. By Definition 2.15, for every $i \le h \le r$:

$$-j + \sum_{l=i}^{h} u_l \ge \sum_{l=i}^{h} w_l. \qquad \text{Eqn. 26}$$

Since $\Sigma_{l=i}^{h} w_i = (h-i+1)\lambda$ and $d_{i,j'}=f_{1,i}-j+1$, for every $i \le h \le t$, $$d_{i,j'} + \sum_{l=i+1}^{h} d_{l,1} =$$

$$-j + 1 + \sum_{l=i+1}^{h} f_{l,1} = -j + 1 + \sum_{l=i}^{h} u_l \ge -j + \sum_{l=i}^{h} u_l \ge \sum_{l=i}^{h} w_l = (h-i+1)\lambda$$

Substitute h by h−1 (for h>i), such that $$d_{i,j'} + \sum_{l=i+1}^{h} d_{l,1} \ge (h-i)\lambda.$$

Thus, $H_{i,j'}$ does not occur, by eqn. 18.
Lemma 2.17. There exists an absolute constant $\alpha$, such that eqn. 13 implies that $H_{i,j}$ does not occur for at least $0.99 f_1$ pairs $(i,j) \in W$.
Proof. By Lemma 2.20, there exists at least $$\sum_{i=1}^{r}(u_i - w_i)$$

winning pairs $(i,j)$ with respect to the (U,W). Also, $\Sigma_{i=1}^{r} u_i = \Sigma_{i=1}^{r} f_{1,i} = f_1$ and $\Sigma_{i=1}^{r} uw = \lambda r$. Thus, there exist at least $f_1 - \lambda r$ winning pairs $(i,j)$ with respect to the (U,W). In the statement of Fact 2.16, the mapping from j to j' is bijection. Thus, there exist at exist $f_1 - \lambda r$ winning pairs $(i,j')$ such that $m_{i,j'}=1$ and $H_{i,j'}$ does not occur. By eqn. 13, we have $f_1 \ge \alpha \lambda r$ and the lemma follows.

Definition 2.18. Let $U=\{u_1, \ldots, u_t\}$ and $W=\{w_1, \ldots, w_t\}$ be two sequences of non-negative integers. Let $1 \le h < t$. Let U',W' be two sequences of size t−h defined by $p'_i = u_{i+h}$, $q'_i = w_{i+h}$ for $i=1, \ldots, t-h$. Denote U',W' as h-tail of the sequences U,W.

Fact 2.19. If $(i,j)$ is a winning pair with respect to h-tail of U,W then $(i+h,j)$ is a winning pair with respect to U,W. If $(i,j)$ is a winning pair with respect to h-tail of U,W the $(i,j)$ is a winning pair with respect to U,W.

Proof. Follows directly from Definitions 2.15 and 2.18.
Lemma 2.20. If $\Sigma_{s=1}^{t}(u_s - w_s) > 0$, then there exist at least $\Sigma_{s=1}^{t}(u_s - w_s)$ winning pairs.

Proof. We use induction on t. For t=1, any pair $(1,j)$ is winning if $1 \le j \le u_1 - w_1$. Consider t>1 and apply the following case analysis.

1. Assume that there exist $1 \le h < t$, such that $\Sigma_{s=1}^{h}(u_s - w_s) \le 0$. Consider the h-tail of U,W. By induction and by Fact 2.19, there exist at least $\Sigma_{s=h+1}^{t}(u_s - w_s) \ge \Sigma_{s=1}^{t}(u_s - w_s)$ winning pairs with respect to U,W.

2. Assume that $(1,u_1)$ is a winning pair. It follows that $(1,j)$, $j < u_1$ is a winning pair as well. If $\Sigma_{s=2}^{t}(u_s - w_s) > 0$, then, by induction and by Fact 2.19, there exist at least $\Sigma_{s=2}^{t}(u_s - w_s)$ winning pairs of the form $(i,j)$ where i>1. In total there are $u_1 + \Sigma_{s=2}^{t}(u_s - w_s) \ge \Sigma_{s=1}^{t}(u_s - w_s)$ winning pairs with respect to U,W. The case when $\Sigma_{s=2}^{t}(u_s - w_s) < 0$ is trivial.

Assume that eqns. 1 and 2 do not hold. Then, $u_1 > 0$. Indeed otherwise $u_1 - w_1 \le 0$ and, thus, eqn. 1 is true. Also, $(1,1)$ is a winning pair. Indeed, otherwise there exists $1 < h < t$ such that $-1 + \Sigma_{i=1}^{t}(u_i - w_i) < 0$. All numbers are integers. Thus, $\Sigma_{i=1}^{h}(u_i - w_i) \le 0$ and eqn. 1 is true. Thus, $(1,1)$ is a winning pair and $(1,u_1)$ is not a winning pair (by eqn. 2). Therefore, there exist $1 < u \le u_1$, such that $(1,u-1)$ is a winning pair and $(1,u)$ is not a winning pair. In particular, there exist $1 \le h < t$, such that $$-u + \sum_{s=1}^{h}(u_s - w_s) < 0.$$

On the other hand, $(1,u-1)$ is a winning pair, thus, $$0 \le 1 - u + \sum_{s=1}^{h}(u_s - w_s).$$

All numbers are integers and, thus, it can be concluded that $$\sum_{s=1}^{h}(u_s - w_s) = u - 1.$$

Consider the h-tail of U,W. By induction, there exists at least $$\sum_{i=h+1}^{t}(u_i - w_i) = \sum_{i=1}^{t}(u_i - w_i) - (u-1)$$

winning pairs with respect to the h-tail of U,W of the form (i,j), where i>1. By properties of u, there exist additional (u−1) winning pairs of the form (1,j), j≤u−1. Summing up, the fact is obtained.

3. The Streaming Algorithm

Fact 3.1. Let $v_1, \ldots, v_n$ be a sequence of non-negative numbers and let k>2. Then, $$\left(\sum_{i=1}^{n} v_i^2\right)^{(k-1)} \leq \left(\sum_{i=1}^{n} v_i^k\right)\left(\sum_{i=1}^{n} v_i\right)^{(k-2)}.$$

Proof. Define $$\lambda_i = \frac{v_i}{\sum_{j=1}^{n} v_j}.$$

Since $g(x)=x^{k-1}$ is convex on the interval $[0,\infty)$, we can apply Jensen's inequality and obtain $$\left(\frac{\sum_{i=1}^{n} v_i^2}{\sum_{i=1}^{n} v_i}\right)^{k-1} = \left(\sum_{i=1}^{n} \lambda_i v_i\right)^{(k-1)} \leq \left(\sum_{i=1}^{n} \lambda_i v_i^{(k-1)}\right) = \frac{\sum_{i=1}^{n} v_i^k}{\sum_{i=1}^{n} v_i}.$$

Let D be a stream. Define:

$$\psi = \frac{n^{1-(1/k)} G_k^{1/k}}{F_1}, \delta = 2\lceil 0.5 \log_2(\psi) \rceil, t = \left\lceil \frac{\delta F_1}{n^{1/k}} \right\rceil, \lambda = \left\lceil \frac{F_1 \delta^3}{n} \right\rceil; \qquad \text{Eqn. 27}$$

where eqn. 2 was used to define $F_k$. We will make the following assumptions:

$$f_1 \leq 0.1 F_1, t \leq F_1, F_1(\text{mod } t)=0 \qquad \text{Eqn. 28}$$

Then, it is possible to define a r×t matrix M, where $r=F_1/t$ and with entries $m_{i,j}=p_{ir+j}$.

Fact 3.2. $1 \leq \delta \leq 2n^{(k-1)/2k}$.

Proof. Indeed $G_1 \leq G_k^{1/k} n^{1-1/k}$ by Holder inequality and since $f_1 \leq 0.1 F_1$ by eqn. 28, we have $\psi \geq 0.5$. Thus, $\lceil 0.5 \log_2(\psi) \rceil \geq 0$ and the lower bound follows. Also, $F_k^{1/k}$ is the $L_k$ norm for the frequency vector since all frequencies are non-negative. Since $L_k \leq L_1$, we conclude that $\psi \leq n^{1-1/k}$ and the fact follows.

Observe that there exists a frequency vector with $\delta = O(1)$: put $f_i=1$ for all $i \in [n]$. At the same time there exists a vector with $\delta = \Omega(n^{(k-1)/2k})$: put $f_1=n$ and $f_j=1$ for $j>2$. It is not hard to see that if $\delta$ is sufficiently large ten a naive sampling method will find a heavy element. For example, in the latter case, the heavy element occupies half of the stream.

Fact 3.3. $\lambda r \leq 4 G_k^{1/k}$.

Proof. Recall that $F_1=rt$. The fact follows from the definitions of $\lambda$ and t.

Fact 3.4.

$$\frac{G_2}{t} \leq G_k^{1/k}.$$

Proof. Define $$\alpha = \frac{k-3}{2(k-2)}.$$

We have by Holder inequality:

$$G_2^{\alpha} \leq G_k^{\frac{2\alpha}{k}} n^{\alpha\left(1-\frac{2}{k}\right)} = G_k^{\frac{k-3}{k(k-2)}} n^{\frac{k-3}{2k}}. \qquad \text{Eqn. 29}$$

Also, by Fact 3.1:

$$G_2^{1-\alpha} = G_2^{\frac{k-1}{2(k-2)}} \leq G_k^{\frac{1}{k(k-2)}} G_1^{\frac{1}{2}}. \qquad \text{Eqn. 30}$$

Thus, $$G_2 \leq G_k^{\frac{k-3}{k(k-2)}} n^{\frac{k-3}{2k}} G_k^{\frac{1}{2(k-2)}} F_1^{\frac{1}{2}} = G_k^{\frac{1}{k}} \frac{F_1}{n^{1/5}} \left(\frac{G_k^{\frac{1}{k}} n^{\frac{k-1}{k}}}{F_1}\right)^{1/2} = t G_k^{\frac{1}{k}}.$$

Fact 3.5.

$$\frac{G_3}{\lambda t} \leq G_k^{1/k}.$$

Proof. By Holder inequality:

$$G_3 \leq G_k^{3/k} n^{1-(3/k)} \qquad \text{Eqn. 31.}$$

Thus, $$\frac{G_3}{\lambda t} = \frac{n^{1+(1/k)} G_3}{F_1^2 \delta^4} \leq \frac{n^{2-(2/k)} G_k^{3/k}}{F_1^2 \delta^4} \leq G_k^{1/k}.$$

Theorem 3.6. Let M be a r×t matrix, such that eqn. 27 is true. Then, there exist absolute constants $\alpha, \beta$ such that:

$$\alpha G_k^{1/k} \leq f_1 \leq \beta t \qquad \text{Eqn. 32;}$$

imply:

$$P(S_r = 1) \geq \frac{\delta}{2n^{1-(2/k)}}. \qquad \text{Eqn. 33}$$

Proof. By eqn. 32 and Facts 3.3, 3.4, and 3.5, $$6\alpha\left(\lambda r + \frac{G_3}{\lambda t} + \frac{G_2}{t}\right) \leq f_1 \leq \beta t.$$

Also, eqn. 27 implies $$f_1/t \geq \frac{\delta}{n^{1-(2/k)}}.$$

Thus, eqn. 33 follows from Theorem 2.1.

This describes an exemplary implementation of pick-and-drop sampling in accordance with the present invention, which can be represented in exemplary code as follows:

Algorithm 1 P&D (M, r, t, λ)

Generate independent identically distributed random variables,
$\{I_j\}_{j=1}^r$ with uniform distribution on [t].
$S_1 = m_{1,I_1}$
$C_1 = d_{1,I_1}$
$q_1 = 1$.
for i = 2 → r do
    if $(C_{i-1} < \max\{\lambda q_{i-1} c_i\})$ then
        $S_i = s_i$,
        $C_i = c_i$,
        $q_i = 1$
    else
        $S_i = S_{i-1}$,
        $C_i = c_i + fs_{i,I}$,
        $q_i = q_{i-1} + 1$
    end if
end for
Output $(S_r, C_r)$ Theorem 3.7. Denote $f_i^k > 100\Sigma_{j \neq i} f_j^k$ as a heavy element. There exist a (constructive) algorithm that makes one pass over the stream and uses $O(n^{1-2/k} \log(n))$ bits. The algorithm outputs a pair $(i, \tilde{f}_i)$, such that with probability 1. If there exists a heavy element $f_i$, then also with constant probability, the algorithm will output $(i, \tilde{f}_i)$, such that $(1-\epsilon)f_i \leq \tilde{f}_i$.

Proof. Define t as in eqn. 27. Without loss of generality, we can assume $F_1$ is divisible by t. Note that if $t > F_1$ or $f_1 \geq 0.1F_1$, then it is possible to find a heavy element with $O(n^{1-2/k})$ bits by existing methods such as in Moses Charikar, Kevin Chen, and Martin Farach-Colton. Finding frequent items in data streams. In ICALP '02: Proceedings of the 29th International Colloquium on Automata, Languages and Programming, pages 693-703, London, UK, 2002. Springer-Verlag, which is incorporated herein by reference. Otherwise, a stream D defines a matrix M for which we compute $O(n^{1-2/k}/\epsilon\delta)$ independent pick-and-drop samples. Since we do not know the value of δ, we should repeat the experiment for all possible values of δ. Output the element with the maximum frequency. With constant probability, the output of the pick-and-drop sampling will include a $(1-\epsilon)$ approximation of the frequency $f_i$. Thus, there will be no other $f_j$ that can give a larger approximation and replace a heavy element. The total space will define geometric series that sums to $O(n^{1-2/k} \log(n))$.

If we know $F_1$ ahead of time then we can compute the value of t for any possible δ and thus solve the problem in one pass. However, one can show that the well-known doubling technique (when we double our parameter t each time the size of the stream doubles) will work in our case and, thus, one pass is sufficient even without knowing $F_1$.

Previously, such as described in Vladimir Braverman and Rafail Ostrovsky. Recursive sketching for frequency moments. CoRR, abs/1011.2571, 2010, which is incorporated herein by reference, we developed a method of recursive sketches with the following property: Given an algorithm that finds a heavy element and uses memory μ(n), it is possible to solve the frequency moment problem in space $O(\mu(n)\log^{(c)}(n))$. In this previous work, we applied recursive sketches with the method of Charikar et.al. cited above. Thus, we can replace the method from Charikar et al. with Theorem 3.7 and obtain:

Theorem 3.8. Let ϵ and k be constants. There exists a (constructive) algorithm that computes $(1 \pm \epsilon)$-approximation of $F_k$, uses $O(n^{1-2/5} \log(n)\log^{(c)}(n))$ memory bits, makes one pass, and errs with probability at most ⅓.

The above analysis focuses on the case when 1 is a "heavy element," but it is possible to repeat arguments for any i. The above Theorem 2.1 claims that 1 will be outputted with probability $$\Omega\left(\frac{f_1}{t}\right)$$

for sufficiently large $f_1$. Notably, Theorem 2.1 holds for arbitrary distributions of frequencies. Furthermore, as addressed with respect to Theorem 3.6, there exist r,t,λ such that a bound similar to eqn. 3 holds. This new method can be combined with other method to obtain, for example, Theorem 3.8

Thus, the pick-and-drop sampling method samples a heavy element, such as an element i with frequency $\Omega(F_k)$) with probability $\Omega(1-/n^{1-2/k})$ and gives approximation $\tilde{f}_i \geq (1-\epsilon)f_i$. In addition, the estimations never exceed the real values, that is $\tilde{f}_j \leq f_j$ for all j. As a result, the space complexity of finding a heavy element can be reduced to $O(n^{1-2/k} \log(n))$ bits. Recursive sketches can be used to resolve the problem with $O(n^{1-2/k} \log(n)\log^{(c)}(n))$ bits. Advantageously, optimizing the space complexity as a function of ϵ can be avoided.

The present invention has been described in terms of one or more preferred embodiments, and it should be appreciated that many equivalents, alternatives, variations, and modifications, aside from those expressly stated, are possible and within the scope of the invention.

The invention claimed is:

1. A database system comprising:
    a database;
    a database server configured to control reading data from and writing data to the database;
    an input to the database server configured to deliver a data stream formed of a sequence of elements, $D=\{p_1, p_2, \ldots, p_m\}$ of size m of numbers from $\{1, \ldots, n\}$ to the database server;
    a non-transitive, computer-readable storage medium, having stored thereon, a computer program that, when executed by a processor, causes the processor to approximate frequency moments $(F_k)$ in the data stream, such that a frequency of an element (i) is defined as $f_i = |\{j : p_j = i\}|$ and a k-th frequency moment of D is defined as $$F_k = \sum_{i=1}^n m_i^k$$

in a single pass through the data stream by the steps of:
    (a) arranging a portion of the data stream in a matrix;
    (b) selecting an initial element in the matrix;
    (c) checking the matrix for a duplicate of the initial element;
    (d) upon identifying a duplicate of the initial element in the matrix, assuming that the initial element appears in each row of the matrix, assigning binary values to all other frequencies, and disregarding the initial element;
    (e) upon completing step (c) without identifying a duplicate of the initial element, assigning a binary value to all frequencies;
    (f) repeating steps (b) through (e) for a each subsequent element in the matrix; and
    (g) generating a report of approximated frequency moments in the data stream.

2. The database system of claim 1 wherein the processor is further caused to implement a local counter to count a number of times an element appears in a suffix of a row in the matrix.

3. The database system of claim 2 wherein the processor is further caused to implement a global counter incremented as a function of the local counter.

4. The database system of claim 3 wherein the processor is further caused to drop and re-initiate the global counter if the local counter exceeds the global counter.

5. The database system of claim 1 wherein the processor is further caused to approximate $f_i$ as $\geq$ a fraction of $f_i$ to limit memory resources used by the processor to estimate $F_k$ to $O(n^{1-2/k} \log(n))$ bits.

6. A method for approximating frequency moments (Fk) in data streams, the method comprising the steps of:
   (a) arranging a portion of the data stream in a matrix, the data streams formed of a sequence of elements, $D = \{p_1, p_2, \ldots, p_m\}$ of size m of numbers from $\{1, \ldots, n\}$ such that a frequency of an element (i) is defined as $f_i = |\{j: P_j = i\}|$ and a k-th frequency moment of D is defined as $$f(k) = \sum_{i=1}^{n} m_i^k;$$

(b) selecting an initial element in the matrix;
   (c) checking the matrix for a duplicate of the initial element;
   (d) upon identifying a duplicate of the initial element in the matrix, assuming that the initial element appears in each row of the matrix, assigning binary values to all other frequencies, and disregarding the initial element;
   (e) upon completing step (c) without identifying a duplicate of the initial element, assigning a binary value to all frequencies;
   (f) repeating steps (b) through (e) for each subsequent element in the matrix; and
   (g) generating a report of approximated heavy elements in the data stream.

7. The method of claim 6 wherein further comprising implementing a local counter to count a number of times an element appears in a suffix of a row in the matrix.

8. The method of claim 7 further comprising implementing a global counter incremented as a function of the local counter.

9. The method of claim 8 further comprising dropping and re-initiating the global counter if the local counter exceeds the global counter.

10. The method of claim 6 further comprising approximating $f_i$ as $\geq$ a fraction of $f_i$ to limit memory resources used by the processor to estimate $F_k$ to $O(n^{1-2/k} \log(n))$ bits.

11. The method of claim 6 further comprising limiting a degree of frequency moment (k) to greater than 2.

12. A non-transitive, computer-readable storage medium, comprising:
   a computer program stored on the non-transitive, computer-readable storage medium that, when executed by a processor, causes the processor to approximate frequency moments ($F_k$) in the data stream, such that a frequency of an element (i) is defined as $f_i = |\{j: P_j = i\}|$ and a k-th frequency moment of D is defined as $$f(k) = \sum_{i=1}^{n} m_i^k$$

in a single pass through the data stream by:
   (a) arranging a portion of the data stream in a matrix;
   (b) selecting an initial element in the matrix;
   (c) checking the matrix for a duplicate of the initial element;
   (d) upon identifying a duplicate of the initial element in the matrix, assuming that the initial element appears in each row of the matrix, assigning binary values to all other frequencies, and disregarding the initial element;
   (e) upon completing step (c) without identifying a duplicate of the initial element, assigning a binary value to all frequencies;
   (f) repeating steps (b) through (e) for a each subsequent element in the matrix: and
   (g) generating a report of approximated frequency moments in the data stream.

13. The non-transitive, computer-readable storage medium of claim 12 wherein the processor is further caused to limit a degree of frequency moment (k) to greater than 2.

* * * * *

UNITED STATES PATENT AND TRADEMARK OFFICE
CERTIFICATE OF CORRECTION

PATENT NO. : 9,158,822 B2  
APPLICATION NO. : 13/684402  
DATED : October 13, 2015  
INVENTOR(S) : Braverman et al.

It is certified that error appears in the above-identified patent and that said Letters Patent is hereby corrected as shown below:

In the Specification

Equation 19 - ">", should be --<--

Signed and Sealed this  
Twenty-second Day of March, 2016

Michelle K. Lee  
*Director of the United States Patent and Trademark Office*